(12) United States Patent
Van Wieringen et al.

(10) Patent No.: US 12,545,494 B2
(45) Date of Patent: Feb. 10, 2026

(54) AEROSOL ACTUATORS AND METHODS OF MAKING THE SAME

(71) Applicant: SILGAN DISPENSING SYSTEMS CORPORATION, Grandview, MO (US)

(72) Inventors: Niels Van Wieringen, S-Hertogenbosch (NL); Brandon Ramsuer, Henrico, VA (US); Zhili Luo, Glen Allen, VA (US)

(73) Assignee: Silgan Dispensing Systems Corporation, Grandview, MO (US)

( * ) Notice: Subject to any disclaimer, the term of this patent is extended or adjusted under 35 U.S.C. 154(b) by 165 days.

(21) Appl. No.: 18/222,702

(22) Filed: Jul. 17, 2023

(65) Prior Publication Data
US 2025/0026558 A1   Jan. 23, 2025

(51) Int. Cl.
| | | |
|---|---|---|
| *B65D 83/20* | (2025.01) | |
| *B65D 83/206* | (2025.01) | |
| *B65D 83/303* | (2025.01) | |
| *B65D 83/48* | (2006.01) | |

(52) U.S. Cl.
CPC ......... *B65D 83/206* (2013.01); *B65D 83/303* (2013.01); *B65D 83/48* (2013.01); *B65D 2547/04* (2013.01)

(58) Field of Classification Search
CPC .... B65D 83/206; B65D 83/303; B65D 83/48; B65D 47/04
See application file for complete search history.

(56) References Cited

U.S. PATENT DOCUMENTS

| | | | | |
|---|---|---|---|---|
| 3,148,806 | A * | 9/1964 | Meshberg | A61M 31/00 239/587.5 |
| 3,993,224 | A * | 11/1976 | Harrison | B65D 83/68 222/541.2 |
| 4,305,528 | A * | 12/1981 | Craig | B65D 83/303 222/530 |
| 4,858,792 | A * | 8/1989 | de Laforcade | B65D 83/20 222/402.1 |
| 5,154,323 | A * | 10/1992 | Query | B65D 83/303 239/588 |
| 6,824,025 | B1 * | 11/2004 | Ruble | B65D 83/30 222/402.1 |
| 7,261,103 | B2 * | 8/2007 | Katz | B05B 11/0091 128/200.23 |
| 8,839,994 | B2 * | 9/2014 | Mason | F16L 37/04 222/402.1 |
| 9,352,896 | B2 * | 5/2016 | Deutsch | B65D 83/303 |
| 10,464,736 | B1 * | 11/2019 | Pindor | B05B 1/1645 |
| 10,919,062 | B2 * | 2/2021 | Schroer | B05B 11/0091 |
| 11,370,600 | B1 * | 6/2022 | Pindor | B05B 1/30 |
| 2002/0053579 | A1 * | 5/2002 | Baumgart | B65D 83/303 222/529 |
| 2009/0039114 | A1 * | 2/2009 | Yamamoto | B65D 83/24 222/402.11 |

(Continued)

*Primary Examiner* — Vishal Pancholi
(74) *Attorney, Agent, or Firm* — Hinckley, Allen & Snyder; Stephen Holmes (57) ABSTRACT

An aerosol dispensing system includes an aerosol actuator attached to an aerosol package, wherein the aerosol actuator includes a unitary body having a manifold and button, an elbow attached to the body, and a straw attached to the body and guided by the elbow from an open position to a closed position.

14 Claims, 9 Drawing Sheets

(56) References Cited

U.S. PATENT DOCUMENTS

| | | | | |
|---|---|---|---|---|
| 2010/0288797 A1* | 11/2010 | Sogaro | ............... | B05B 11/0089 |
| | | | | 222/402.1 |
| 2022/0410191 A1* | 12/2022 | Falcon | ................... | B65D 47/04 |
| 2023/0226564 A1* | 7/2023 | Meshberg | ........... | B05B 11/0091 |
| | | | | 222/320 |

* cited by examiner

AEROSOL ACTUATORS AND METHODS OF MAKING THE SAME

BACKGROUND OF THE INVENTION

Field of the Invention

Embodiments of the invention relate to aerosol actuation systems including spray through systems having minimal parts and methods for constructing and using such actuators.

Description of Related Art

Aerosol dispensing systems are well known and are used with a multiplicity of products, including but not limited to beauty care formulations, air care formulations, healthcare formulations, home and garden formulations, paint formulations, and the like. Many aerosol dispensing systems include a container holding a pressurized product, a valve attached to the container, and an actuator configured to open and shut the valve, allowing product to escape the container.

Various types of containers may be used or configured for use in an aerosol dispensing system and the containers may be made of a metal, plastic, or other material as desired. Such containers are well known and are generally standardized in the aerosol industry.

Similarly, aerosol valve systems are common and different standard configurations may be selected based on the container to be used, the type of product or aerosol propellent used, and the type of actuator selected for an aerosol dispensing system.

Known actuators include push buttons, trigger actuated dispensers, or combination sprayer systems such as those including a straw or tube through which product may be directed. For example, simple push buttons having a path from a valve opening through an orifice in the push button may be attached to a valve and then pushed to engage the valve and disperse product through the orifice in the push button. Some such push buttons may also include an orifice cup in the orifice of the push button to control the spray pattern of a product dispersed by the aerosol dispensing system. Many paint applications include simple push button actuation systems.

Trigger actuators are also used with aerosol dispensing systems and typically include more parts—and more material—making such actuators more expensive. For example, many air care formulations are dispensed utilizing trigger actuated aerosol dispensing systems wherein a user pulls on or pushes a trigger or lever which translates the force onto or through a manifold resulting in the actuation and opening of a valve in communication with the manifold and dispensing of a product. Upon release of the trigger or lever, the valve is shut and the flow of product ceases.

In other instances, aerosol actuators may include a tube through which the product is dispersed. Use of a tube allows the product to be directed into a particular spot or location desired by the user. Some such actuation systems include a tube that may be inserted into an orifice of a push button. These systems work, but the tube can fall out, or get lost, or if not inserted correctly, create a mess with some product being dispensed through the tube and some squirting out the sides of the orifice/tube connection. Other actuator systems are more elaborate, wherein the tube or a straw may be moved into a position such that the user may dispense the product with the tube or straw. In such systems, it may also be possible to dispense the product as a spray in one position and through a straw in a second position. While the tube or straw is not as easy to misplace in such systems, and the system is cleaner than traditional tube and push button systems, these solutions cost more and use more product because of the number of moving parts and the sealing tolerances that must be met in the manufacturing and the assembly processes.

BRIEF SUMMARY OF THE INVENTION

According to certain embodiments of the invention, an aerosol dispensing system includes a container, a valve system, and an actuator. The actuator includes a body, an elbow, and a straw, wherein the body is attached to the container and includes an integral manifold having a valve opening attached to the valve system and a straw orifice into which the straw is inserted. The elbow is attached to the body and bends the straw in a closed position and straightens the straw in an open position. In the closed position, the elbow may also hinder or prevent actuation of the aerosol dispensing system.

According to some embodiments of the invention, an actuator body may include a body shroud having an interior space defined by the body shroud walls, a manifold integrally molded with the body shroud, a button connected to the manifold or integral therewith, and an elbow connection configured to support and secure an elbow assembled with the body. The body may also include a lip, flange, snap bead, or other connection features to enable the body to be snapped onto, or secured to, a container.

An elbow according to various embodiments of the invention may include a body post, a partial mandrel surface spaced away from the body post and a straw opening adjacent a portion of the partial mandrel surface. A flange may extend off a portion of the elbow. The flange may be engaged by a user to rotate the elbow from a closed position to an open position.

A straw may be positioned such that it extends through the straw tube, along a portion of the partial mandrel surface, and into the body. In a closed position, the straw is bent around the partial mandrel surface and rests adjacent the container. In an open position, the straw is relatively straight, extending away from the body, According to various embodiments of the invention, a body may include a button that can be pushed or pressed to actuate the aerosol dispensing system and dispense a product from the container when the elbow is in an open position. In a closed position, the button may be restricted from movement, for example, the elbow may exert a force against the button in an closed position such that the actuator cannot be actuated. When moved to an open position, the elbow frees the button to be pressed or pushed, allowing actuation of the aerosol dispensing device.

According to other embodiments of the invention, an aerosol dispensing system may be assembled by providing a body, and elbow, and a straw; snap fitting the elbow into the body and aligning the elbow in an open position; inserting the straw through the straw opening and into the body; and attaching the actuator to a container and valve.

BRIEF DESCRIPTION OF THE SEVERAL VIEWS OF THE DRAWINGS

While the specification concludes with claims particularly pointing out and distinctly claiming particular embodiments of the present invention, various embodiments of the invention can be more readily understood and appreciated by one of ordinary skill in the art from the following descriptions of various embodiments of the invention when read in conjunction with the accompanying drawings in which:

DETAILED DESCRIPTION OF THE INVENTION

Figure 1:
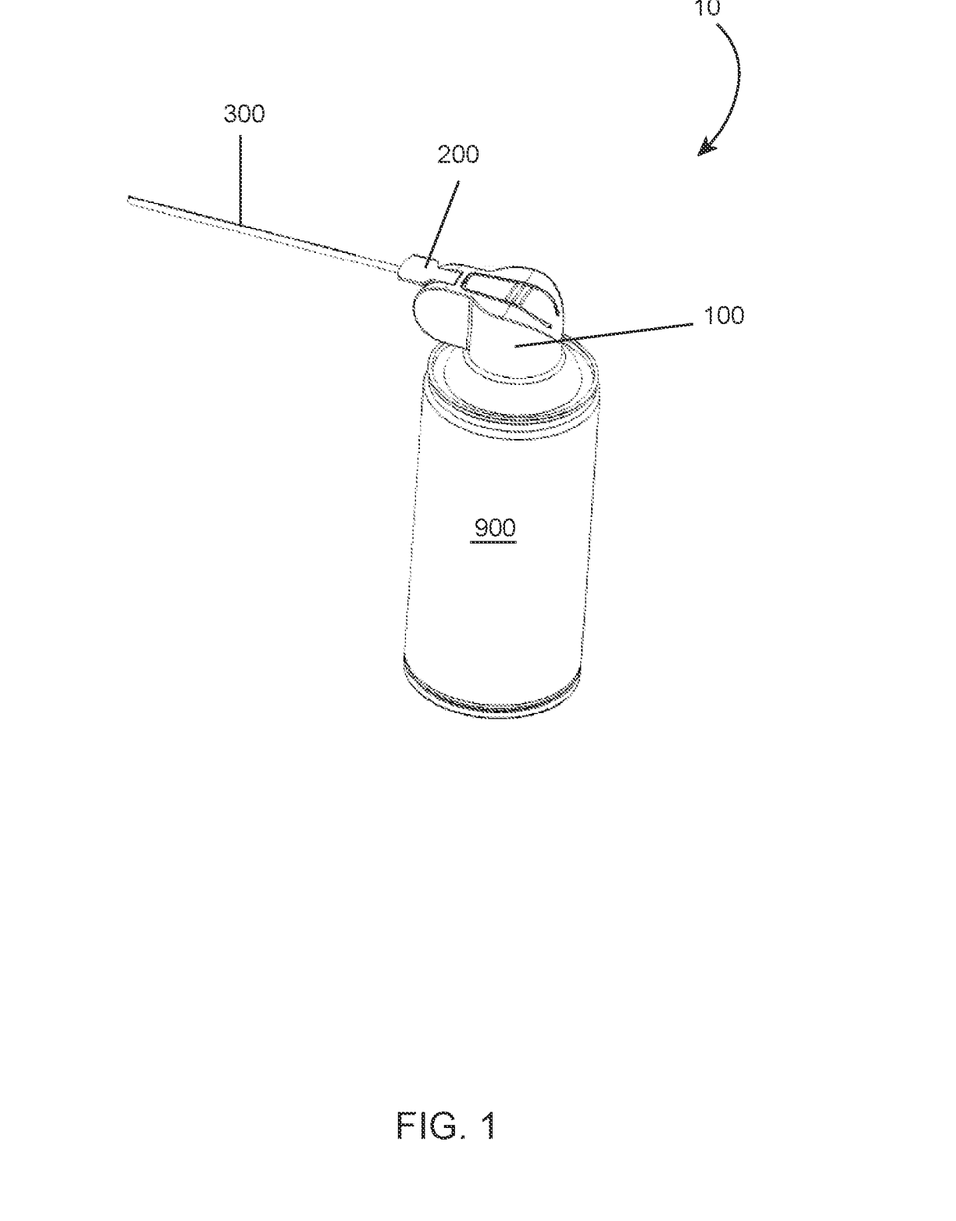
FIG. 1 illustrates an aerosol dispensing system according to various embodiments of the invention.

According to various embodiments of the invention, an aerosol dispensing system 10 may include a container 900, a body 100 attached to the container 900, an elbow 200 attached to the body 100, and a straw 300 in contact with the elbow 200 and attached to the body 100 as illustrated in FIG. 1. As illustrated in FIG. 1, the aerosol dispensing system 10 is in an open position wherein the straw 300 extends substantially horizontally away from the body 100. Upon actuation of the aerosol dispensing system 10, product from container 900 is dispersed through straw 300.

Figure 2:
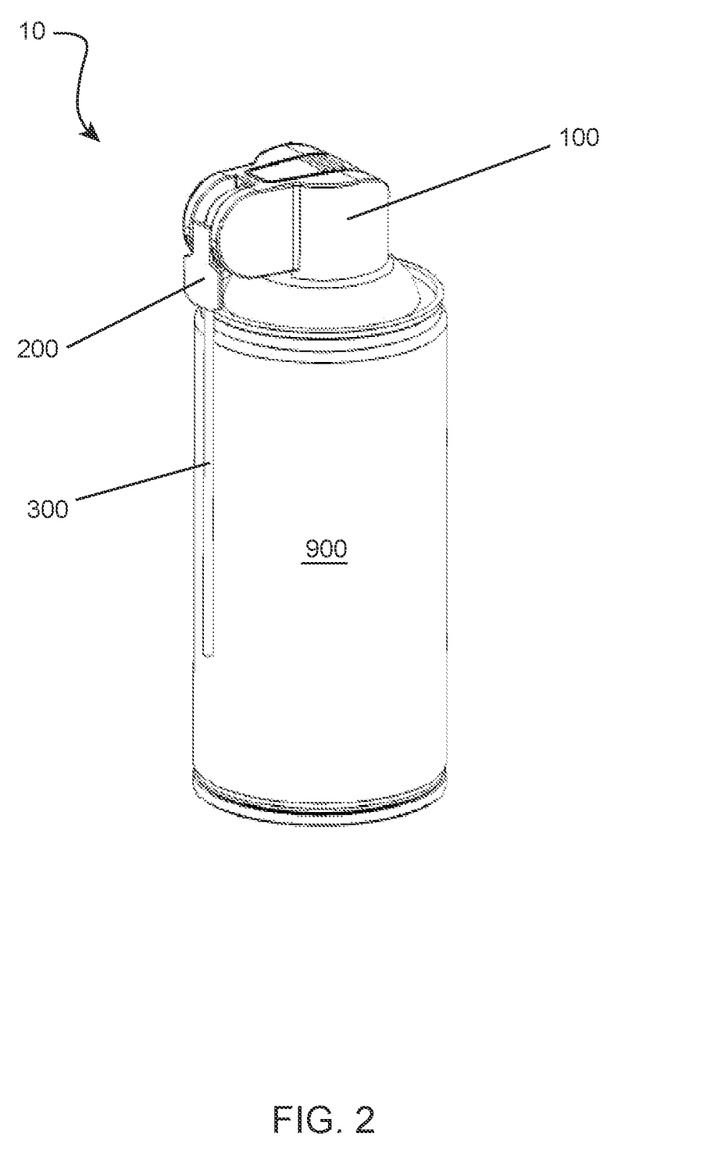
FIG. 2 illustrates an aerosol dispensing system according to various embodiments of the invention.

The same aerosol dispensing system 10 illustrated in FIG. 1 is illustrated in FIG. 2, except that the aerosol dispensing system 10 is in a closed position. In the closed position, the aerosol dispensing system 10 is unable to dispense a product from container 900.

According to various embodiments of the invention, an aerosol dispensing system 10 includes an aerosol package 950 attached to an aerosol actuator 50. An aerosol package 950 may include a container 900 having a valve cup 910 and valve 920 attached thereto. The container 900 may be filled with a product and a propellant as known in the art. An aerosol actuator 50 according to embodiments of the invention includes an assembled body 100, elbow 200, and in some cases, a straw 300. The aerosol actuator 50 may be attached to the aerosol package 950 as illustrated in FIGS. 1 and 2.

Figure 3:
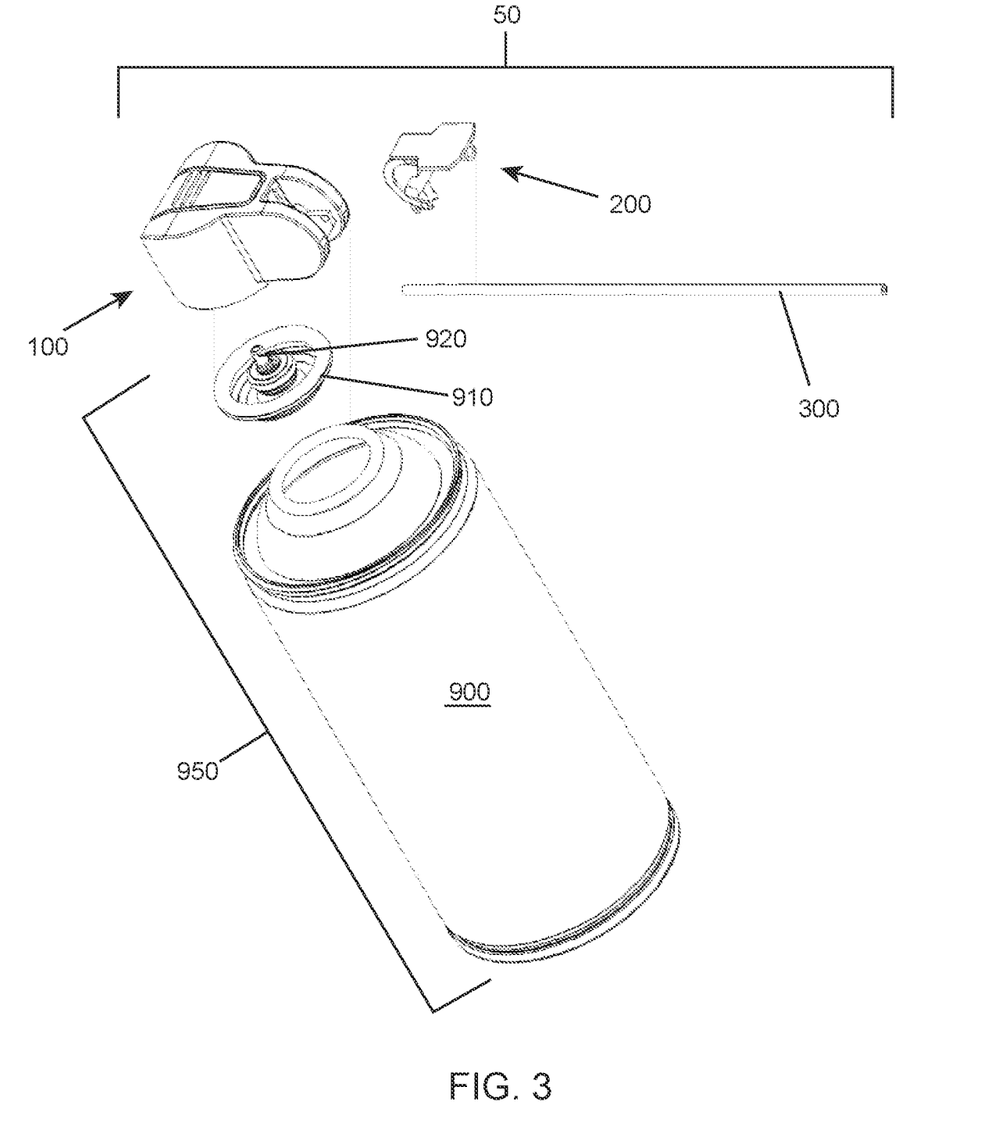
FIG. 3 illustrates a blown apart view of an aerosol actuator according to various embodiments of the invention.

A blown-apart view of the components of the aerosol dispensing system 10 is illustrated in FIG. 3. According to various embodiments of the invention, an aerosol dispensing system 10 includes a container 900 to which a valve cup 910 and valve 920 may be assembled in accordance with known processes. The container 900 may include standard sizes used in existing aerosol applications or may be a custom container 900 having a custom shape or made of a customer material. The container 900 may also be filled with a product utilizing known processes. An actuator 50 may be attached to the valve cup 910 or to an edge of the container 900. The actuator 50 may include an assembled body 100, elbow 200 and in some cases, a straw 300.

Figure 4:
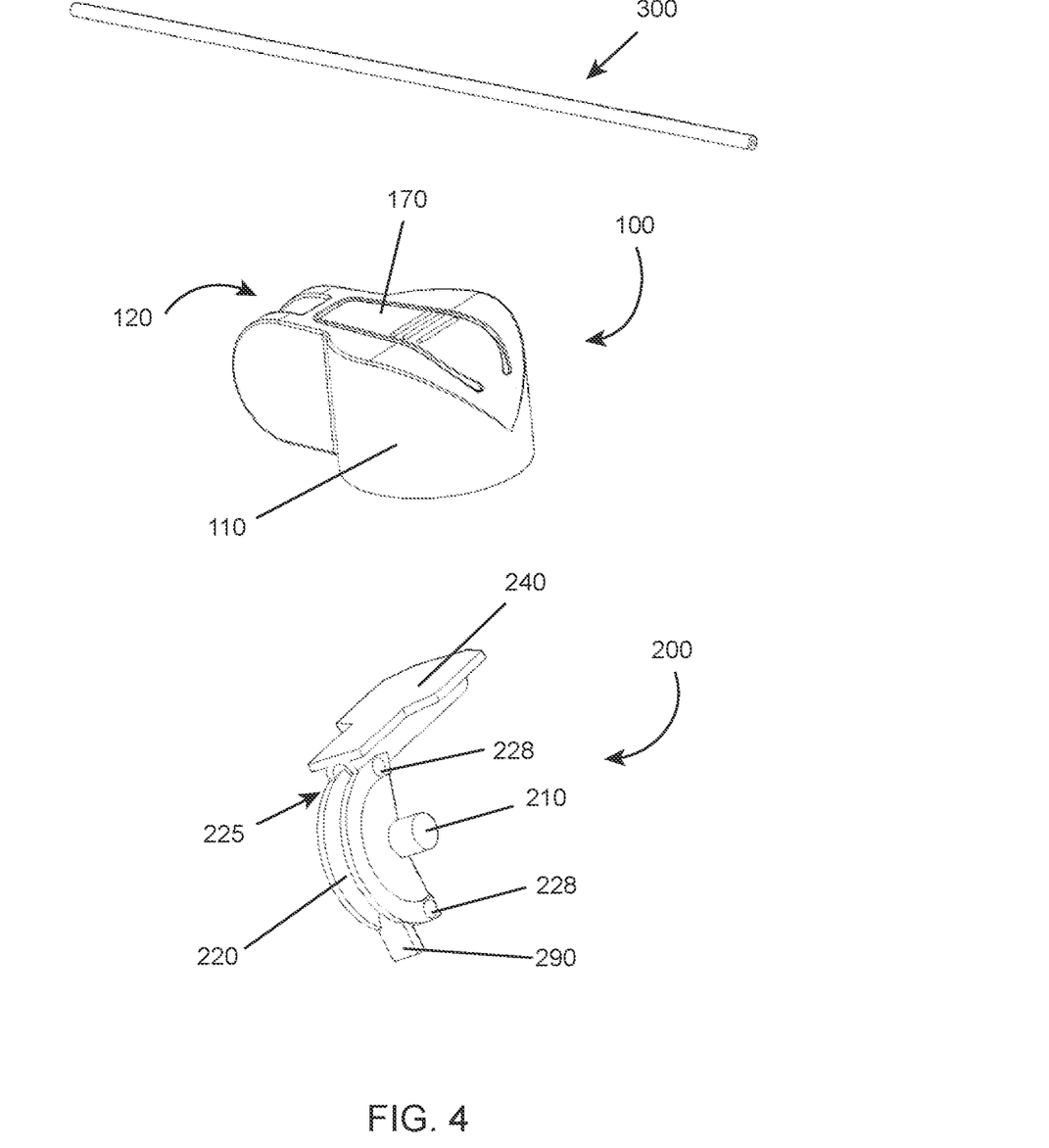
FIG. 4 illustrates various components of an aerosol actuator according to various embodiments of the invention.

An aerosol actuator 50 according to various embodiments of the invention includes a body 100 and an elbow 200. The aerosol actuator 50 may also include a straw 300. The components of an aerosol actuator 50 according to various embodiments of the invention are illustrated in FIG. 4. As illustrated, a body 100 may include a wall 110 defining an outer surface of the body 100. The wall 110 may be configured in a desired shape and may provide an aesthetic look that is desired for a particular aerosol application to which the aerosol actuator 50 shall be used. The wall 110 forms a shroud or the shape of the body 100 and includes an opening 190 configured to mate to a container 900 or to a valve cup 910 of a container 900. The wall 110 may also define an elbow opening 120 into which an elbow 200 may be inserted to be assembled with the body 100. The body 100 may be of unitary construction, molded as a single component.

An elbow 200 may be inserted into the elbow opening 120 of the body 100 and assembled with the body 100 as part of the aerosol actuator 50. The elbow 200 may include one or more pins 210 which may seat in a portion of the body 100 and allow the elbow 200 to rotate about a pin 210 relative to the body 100. An elbow 200 may also include a mandrel surface 220 shaped in a partial arc or having a circular or rounded shape. The mandrel surface 220 may include a groove into which a straw 300 may fit or slide. The elbow 200 may also include a straw guide 225. A straw guide 225 may include a tube through which a straw 300 may be inserted or it may include guide walls, flanges, or other features configured to hold a straw 300 in position on the elbow 200 such that the straw 300 seats along the mandrel surface 220 or in a groove in the mandrel surface 220. An elbow 200 may also include one or more locking tabs 290. An elbow flange 240 may also be molded as part of an elbow 200 to provide a surface for a user to grasp or apply a force in order to rotate an elbow 200 relative to a body 100 when assembled as part of an aerosol actuator 50.

A straw 300 according to embodiments of the invention may be a cylindrical tube having a circular cross-section or it may be a different shape, for example, triangular. In certain embodiments, a straw 300 is an extruded tube made of a plastic material or extruded from a plastic or polymeric material. The materials selected to form the straw 300 may be recyclable, compostable or may be made of recycled materials. Straws 300 may be sourced from known sources or extruded with particular dimensions to fit into the body 100 and the elbow 200 in order to assemble aerosol actuators 50 according to various embodiments of the invention.

Figure 5:
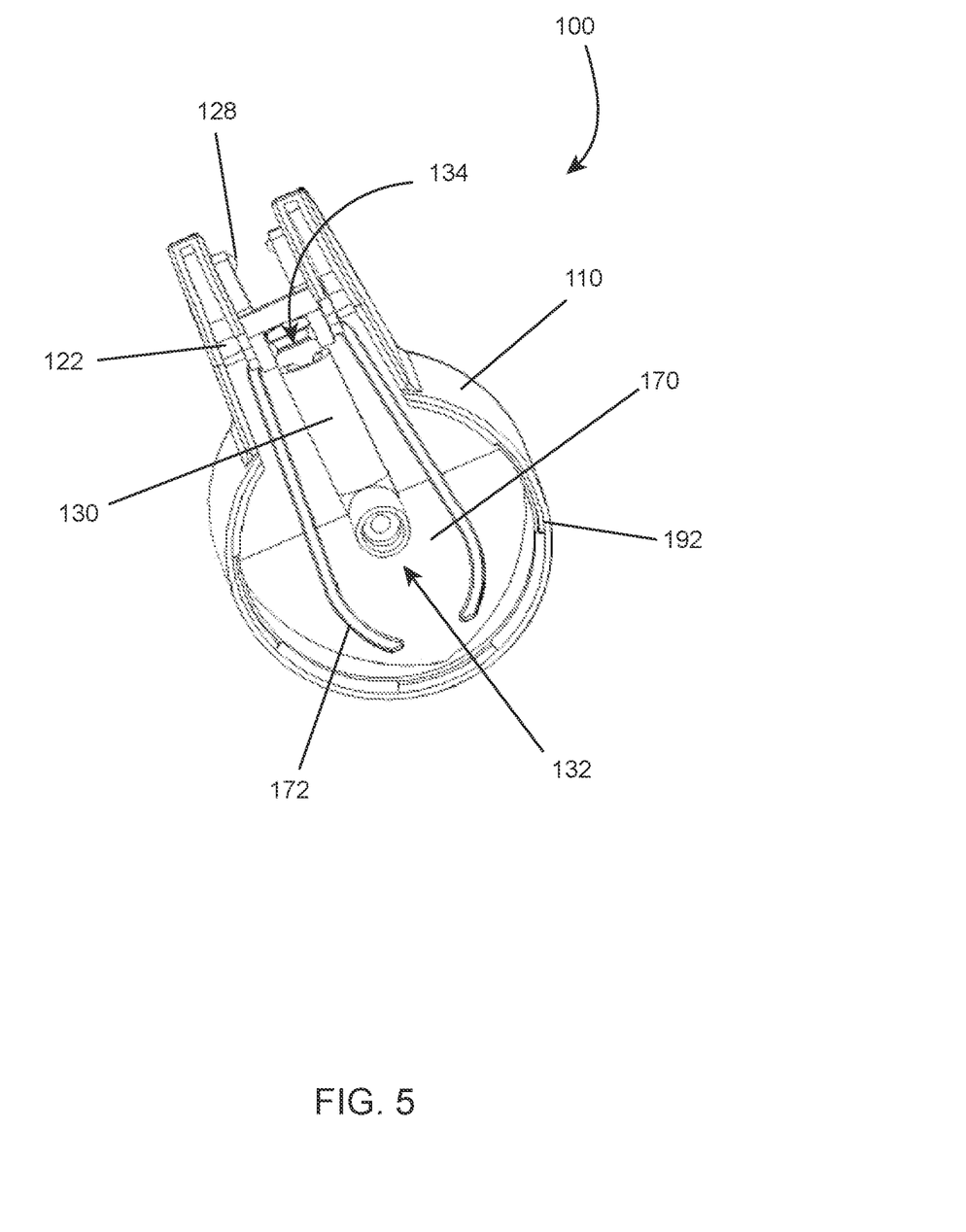
FIG. 5 illustrates a bottom view of a body according to various embodiments of the invention.
Figure 6:
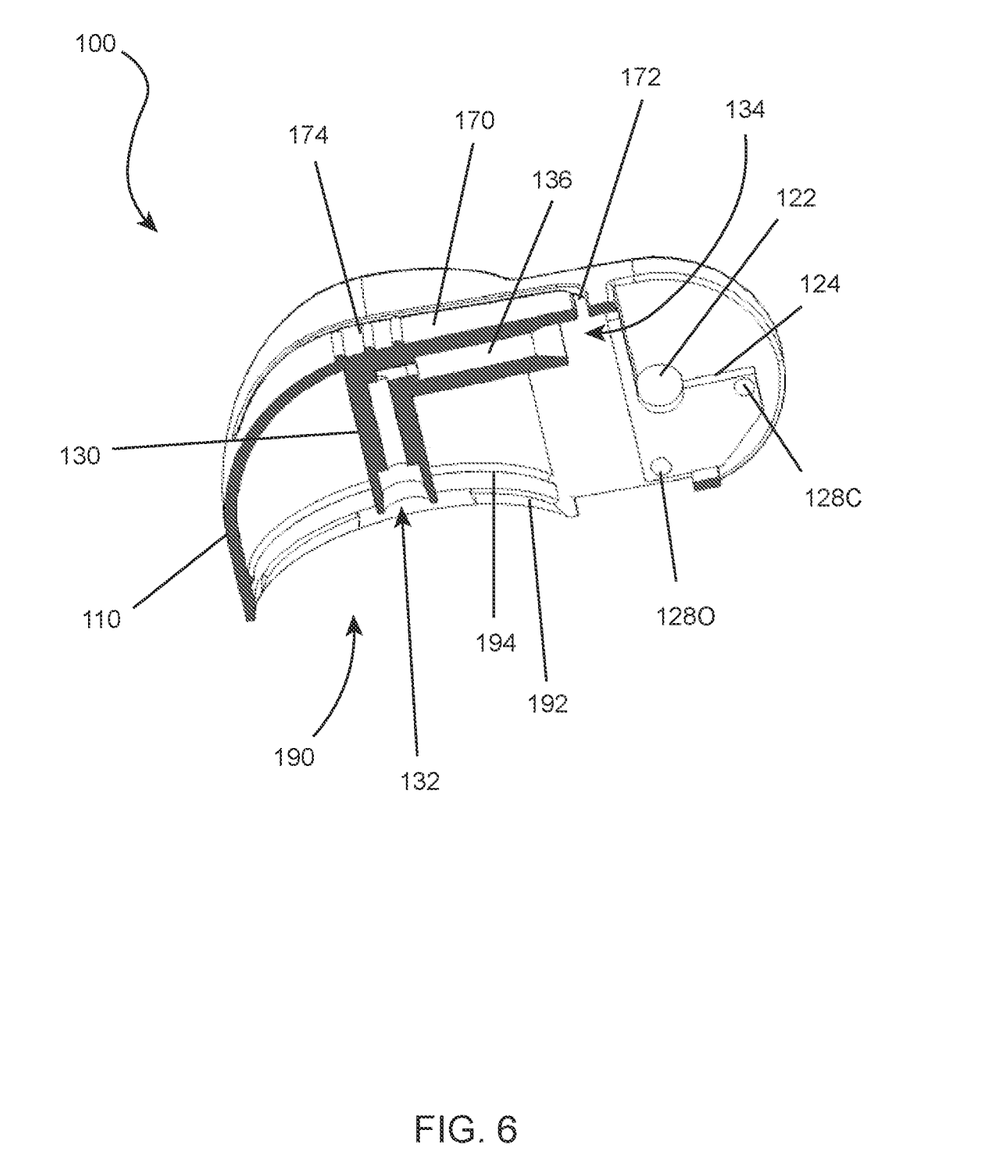
FIG. 6 illustrates a cross-sectional perspective view of a body according to various embodiments of the invention.

A bottom view of a body 100 according to various embodiments of the invention is illustrated in FIG. 5 and a cross-sectional perspective view of a body 100 is illustrated in FIG. 6. A wall 110 defines an exterior shape of the body 100, including an elbow opening 120. Within the elbow opening 120 features may be included to facilitate assembly of an elbow 200 with the body 100 and movement of the elbow 200 relative to the body 100 once assembled. For example, as illustrated in FIGS. 5 and 6, a wall 110 may define one or more pin holes 122 configured to accept a pin 210 of an elbow 200 when the elbow 200 is assembled to a body 100. During assembly, a portion of the body 100 adjacent the elbow opening 120 may flex to allow an elbow 200 pin 210 to pass into the elbow opening 120 and snap into place within a pin hole 122. Corresponding pin hole 122 may be formed on wall 110 portions opposite each other within the elbow opening 120 such that a pin 210 is supported on both ends when an elbow 200 is assembled with a body 100.

One or more stop surfaces 124 may also be defined by wall 110 within the elbow opening 120. In some embodiments of the invention, a stop surface 124 may be positioned to engage one or more elbow stop surfaces 224 to prevent further rotation of an elbow 200 within the elbow opening 120 when assembled with a body 100. For example, when an elbow 200 is in an open position, the elbow stop surface 224 is not engaged or seated against the stop surface 124 of the body 100. However, as the elbow 200 is moved from an open position to a closed position, elbow stop surface 224 engages stop surface 124, preventing further rotation of elbow 200 which is then in a closed position.

According to other embodiments of the invention, a stop surface 124 may not engage with an elbow stop surface 224 but they may be included to narrow the play between the elbow 200 and the body 100 to provide a snug fit of the elbow 200 in the body 100.

In some embodiments of the invention, the body 100 may include one or more locking bumps 128 configured to engage with one or more locking indentations 228 in an elbow 200. A locking bump 128 may be configured to seat in a locking indentation 228 of the elbow 200 to hold the elbow 200 in an open or closed position. When open, locking bumps 128 seat in the locking indentations 228 of the elbow 200 to retain the elbow 200 in the open position until a force is applied to move the elbow 200 into a closed position in which case a first set of locking bumps 128O disengage with a first set of locking indentations 228O and a second set of locking bumps 128C engage with a second set of locking indentations 228C to retain the elbow 200 in a closed position.

According to various embodiments of the invention, a button 170 is defined in the wall 110 by a button gap 172 that at least partially surrounds the button 170. The button gap 172 allows the button 170 portion of the wall 110 to flex and move when a force is applied to the button 170. The button 170 may be a tab in the wall 110 of the body 100 defined by the button gap 172. The button 170 may be pressed by a user to actuate the aerosol actuator 50. According to certain embodiments of the invention, the button 170 may be integrally molded with a manifold 130 as illustrated in FIGS. 5 and 6. In other embodiments, a separate manifold may be used with an aerosol actuator 50 according to embodiments of the invention and the button 170 may be configured to engage the manifold when pressed. The manifold 130 illustrated in FIGS. 5 and 6 may move when a user presses on button 170 such that the valve connection 132 seated on a valve 920 engages the valve 920 to release product from the container 900, through the valve 920 and into the manifold 130. A fluid flow path 136 between the valve connection 132 and the straw orifice 134 of the manifold 130 provides a path along which product escaping the valve 920 may flow. According to embodiments of the invention, a manifold 130 valve connection 132 and a manifold 130 straw orifice 134 may be molded, shaped, or configured to fit with a valve 920 or a straw 300, respectively.

A button 170 according to embodiments of the invention may also include tactile features 174 to alert a user to the location on the button 170 that is best pressed to engage the button 170 and release a product from the aerosol actuator 50. Tactile features 174 may also be used to identify a brand name or other symbol as desired.

A body 100 also includes a opening 190 through which a portion of a container 900 or valve cup 910 may be inserted. Along the edge of the opening 190, or just interior the edge of the opening 190, one or more attachment features may be include to facilitate the attachment of an aerosol actuator 50 to a container 900 or valve cup 910. For example, attachment features may include snap beads, flanges, bayonet connections, screw connections, or other connection features commonly used with other aerosol actuation systems and products. As illustrated in FIGS. 5 and 6, one or more flanges 192 may be positioned along the edge of the opening 190 and a stop bead 194 may be spaced interior of the flanges 192 such that the body 100 may be snapped onto a valve cup 910 or container 900 edge, with the stop bead 194 stopping further insertion of the valve cup 910 or container 900 into a body 100 interior and the flanges 192 snapping to the valve cup 910 or container 900.

Figure 7:
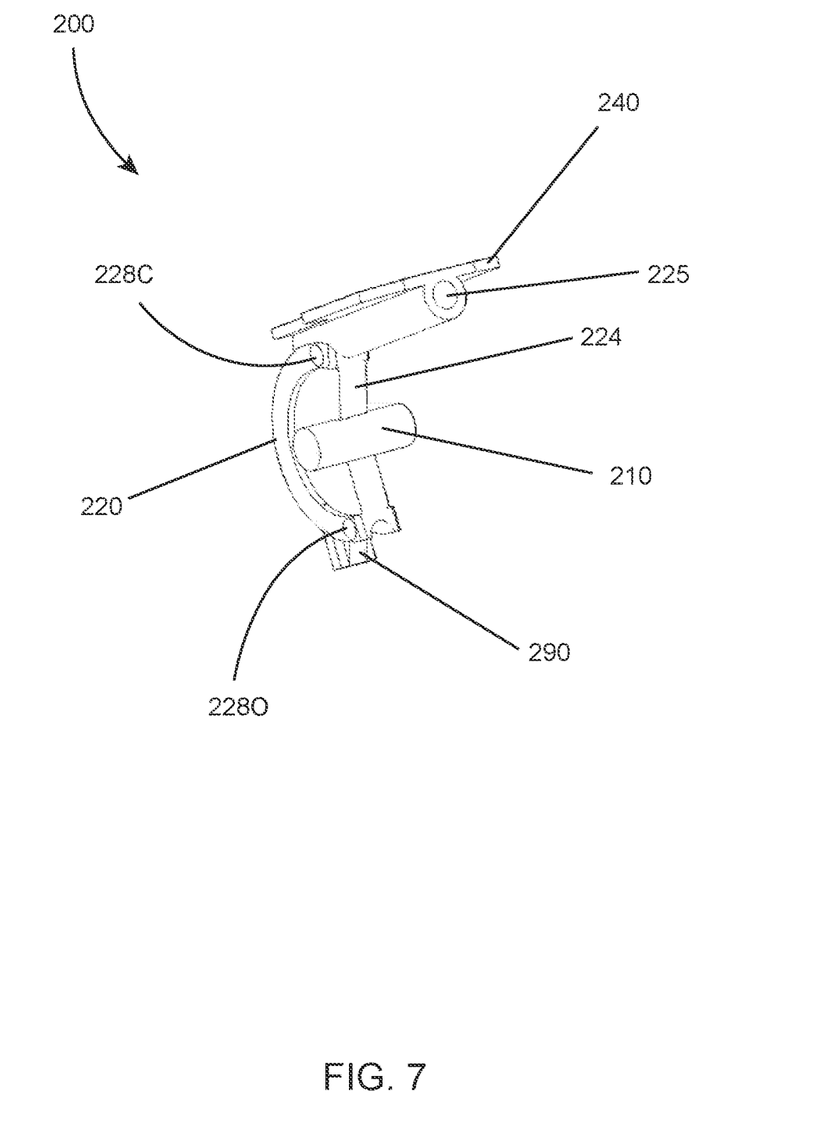
FIG. 7 illustrates an elbow according to certain embodiments of the invention.

An elbow 200 according to certain embodiments of the invention is illustrated in FIG. 7. An elbow 200 may include a pin 210, a mandrel having a mandrel surface 220, a straw guide 225, an elbow flange 240 and a locking tab 290 as illustrated in FIG. 7. According to certain embodiments of the invention, a pin 210 may be configured to mate with or seat in a pin hole 122 of a body 100. When seated as such, the elbow 200 may rotate relative the body 100 about the pin 210.

A mandrel and mandrel surface 220 may be generally circular in shape and extend off of or away from the pin 210 with the mandrel surface 220 being spaced from the pin 210 at a distance desired to assist with the movement and bending of a straw 300 between an open and closed actuation position. An end of the mandrel surface 220 may be adjacent a straw guide 225 configured to support a straw 300 assembled with the elbow 200 and a body 100. As illustrated in FIG. 7, a straw guide 225 may include a tube through which a straw 300 may be inserted. In some embodiments, an inner diameter of such a tube may be greater than the outer diameter of a straw 300 such that the straw 300 may move freely within the straw guide 225 as the elbow 200 is rotated relative to the body 100. In other embodiments of the invention, a straw guide 225 may include flanges, hooks, walls or other features configured to hold and guide a straw 300.

An elbow 200 may also include one or more elbow flanges 240 configured to allow a user to apply a force to the elbow 200 to assist with the movement thereof relative to the body 100. For example, as illustrated in FIG. 7, a flange 240 may include a wider surface upon which a user may grasp or push to move the elbow 200.

One or more locking indentations 228 may also be included in the elbow 200. In various embodiments of the invention, a locking indentation 228 may mate with a locking bump 128 on the body 100 to fix the elbow 200 in a position relative to the body 100. For instance, in an open position, locking bumps 128O of the body 100 may be seated in the locking indentations 228O of the elbow 200. In a closed position, locking bumps 128C may be seated in the locking indentations 228C of the elbow 200. In some embodiments, the size of the locking bumps 128 and the locking indentations 228 may be such that it takes an increased force to move the elbow 200 into position so that the locking bumps 128 seat in the locking indentations 228; in this way a user knows through feel when the elbow 200 is moving into an open or closed position.

While the locking bumps 128 are shown on the body 100 in various embodiments of the invention—and the locking indentations 228 are showing on the elbow 200—it is understood that the opposite could also be true. Locking bumps 128 could be configured on the elbow 200 with corresponding locking indentations 228 on the body 100.

In some embodiments of the invention, a straw 300 may include one end having a larger or smaller outer diameter than the opposite end. In this manner, a straw 300 may be provided such that one end is configured and sized to mate with the straw orifice 134 in the manifold 130 and provide a snug or tight fit. Preferably, once a straw 300 is inserted into the straw orifice 134 of the manifold 130 it will not disengage therefrom. In some instances, a glue, adhesive, sonic welding, or other fixation process may be used to help ensure that a straw 300 is engaged and fixed in the straw orifice 134 of a manifold 130.

According to embodiments of the invention, the body 100 and elbow 200 of an aerosol actuator 50 may be molded and assembled. Following molding of the body 100 and elbow 200, the elbow 200 may be inserted into the elbow opening 120. That assembly may be shipped to be used to assemble a complete aerosol dispensing system 10 by attaching the aerosol actuator 50 to a container 900 or valve cup 910 of an aerosol package and then inserting a straw 300 through the straw guide 225 of the elbow 200 and into the straw orifice 134 of the manifold 130 of the body 100. Insertion of the straw 300 into the straw orifice 134 may be sufficient to hold or retain the straw 300 in the manifold 130.

According to other embodiments of the invention, following assembly of a body 100 and elbow 200, the elbow 200 may be positioned in an open position such that a straw 300 may be assembled to the body 100 and elbow 200 by inserting a straw 300 into the straw guide 225, over a portion of the mandrel surface 220 and into the straw orifice 134 of the body 100. The insertion force of the straw 300 may be sufficient to attach the straw 300 to the manifold 130. In some embodiments, the elbow 200 may then be rotated or moved into a closed position such that the elbow 200 moves relative to the body 100 and the straw 300 is allowed to move through the straw guide 225 as the straw 300 is bent along the mandrel surface 220 until the elbow 200 is seated in a closed position.

Figure 8:
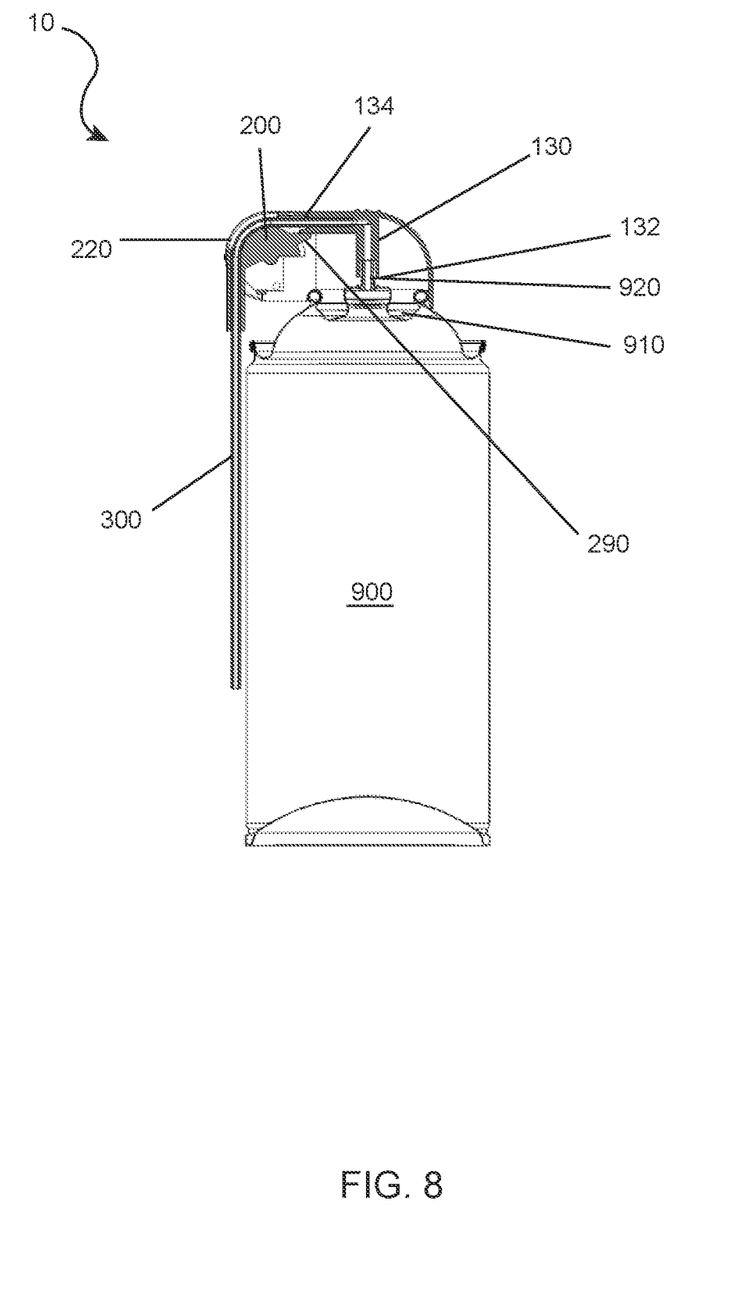
FIG. 8 illustrates a cross-sectional view of an aerosol dispensing system according to various embodiments of the invention.
Figure 9:
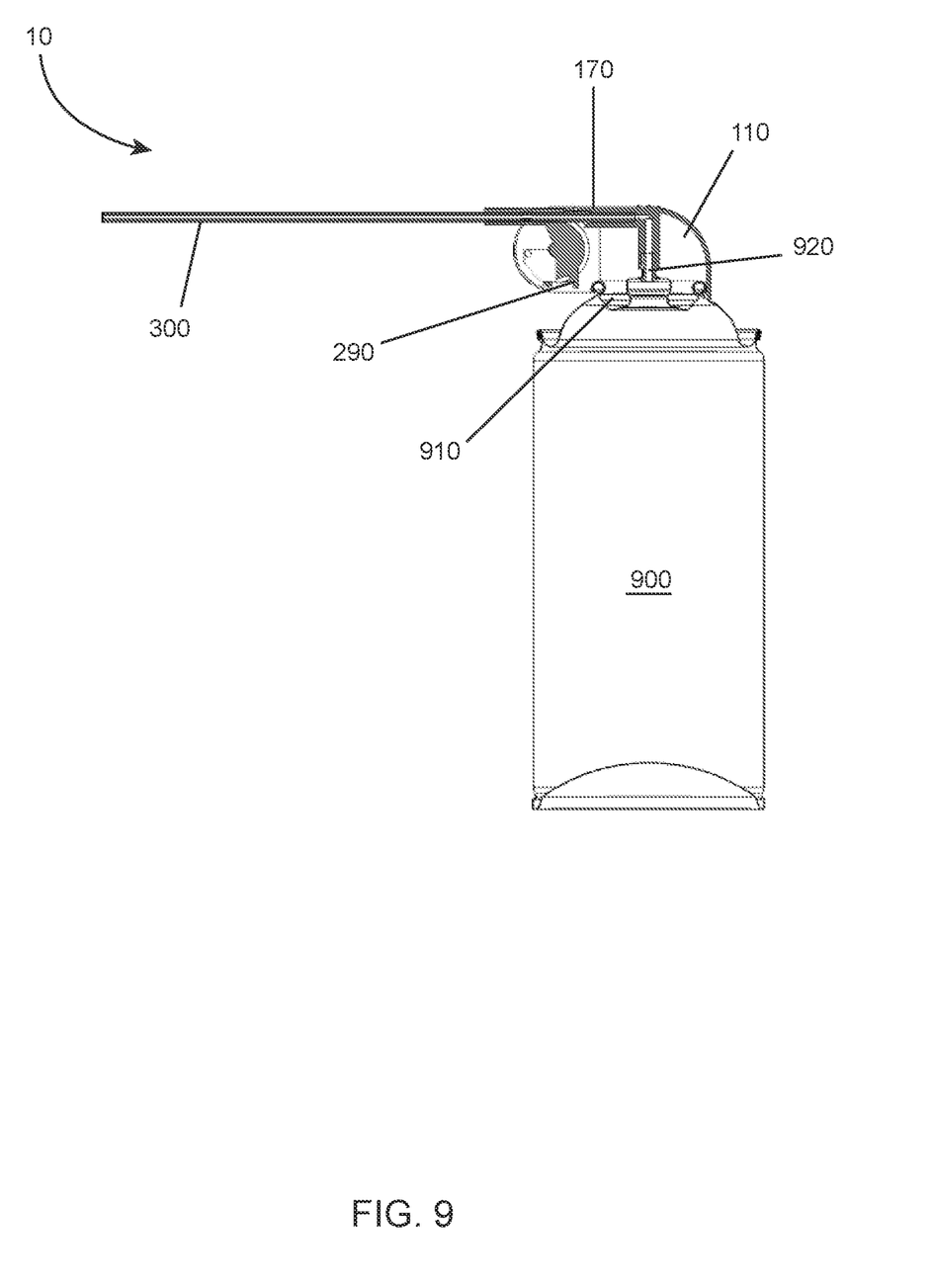
FIG. 9 illustrates a cross-sectional view of an aerosol dispensing system according to various embodiments of the invention.

A cross-sectional view of an aerosol dispensing system 10 in a closed position according to various embodiments of the invention is illustrated in FIG. 8 and a cross-sectional view of the same aerosol dispensing system 10 in an open position is illustrated in FIG. 9.

An aerosol actuator 50 may be connected to an aerosol package including a container 900, a valve cup 910, and a valve 920 as illustrated in FIG. 8. The body 100 of the aerosol actuator 50 is attached to or about the valve cup 910 as illustrated. The valve 920 is seated in or sealing engaged with the valve connection 132 of the manifold 130. The elbow 200 and straw 300 are assembled with the body 100 such that one end of the straw 300 is seated in or sealing engaged with the straw orifice 134. The elbow 200 is positioned in a closed position such that the straw 300 is bent around the mandrel surface 200.

According to various embodiments of the invention, when the elbow 200 is positioned in a closed position, a locking tab 290 of the elbow 200 engages or abuts the manifold 130, button 170, or exterior portion of the straw orifice 134 of the manifold 130, thereby preventing movement of the manifold 130, button 170, or both, and preventing actuation of the aerosol actuator 50. For example, in a closed position as illustrated in FIG. 8, the locking tab 290 of the elbow 200 is positioned against the manifold 130 of the body 100, preventing actuation of the button 170 when the aerosol actuator 50 is in the closed position.

As illustrated in FIG. 8, if button 170 is pressed, the positioning of the locking tab prevents actuation of the aerosol actuator 50.

The aerosol dispensing system 10 illustrated in FIG. 9 is in an open position, the elbow 200 having been rotated such that the straw 300 is in a relatively horizontal or straight position aligned with the straw orifice 134 of the manifold 130. In addition, the locking tab 290 of the elbow 200 is disengaged from the manifold 130, allowing movement of the manifold 130 upon actuation of a force against the button 170. If a force is applied to button 170, button 170 moves the manifold 130 which in turn engages the valve 920, opening the valve 920 and allowing a product to escape the container 900 and travel through the manifold 130 and into the straw 300. Product then escapes the extended straw 300 through the end opposite the straw 300 end inserted into the straw orifice 134 of the manifold 130. A user may therefore point the open straw 300 end at a desired location and press button 170 to release an aerosol product at the desired position.

According to various embodiments of the invention, an aerosol actuator 50 may be used in the following manner. An aerosol dispensing system 10 may be provided to a user. The aerosol dispensing system 10 may include an aerosol actuator 50 in a closed position. The user may apply a force to an elbow flange 240 to rotate the elbow 200 into an open position. An open end of the straw 300 may be pointed at a desired location to apply a product from the aerosol dispensing system 10 and the button 170 pressed. Actuation of the button 170 moves the manifold 130, actuating and opening the valve 920 such that a product is dispensed from the container 900, through the manifold 130, and into the straw 300 where it exits the open end at the desired location. Following use, a user may apply a force to the elbow flange 240, rotating the elbow 200 into a closed position where application of a force against button 170 does not actuate the aerosol dispensing system 10 because a locking tab on the elbow 200 prevents movement of the manifold 130 or the translation of force from the button 170 to the manifold 130.

The body 100 and elbow 200 components of aerosol actuators 50 according to embodiments of the invention may be molded from resin, plastic, polymers, or other materials. In some instance, the materials used to mold the components may be recyclable. In other instances, compostable materials may be used. In still other embodiments, reclaimed or recycled materials may be used to mold or otherwise form the components of aerosol actuators 50.

While embodiments of the aerosol actuators 50 of the present invention are illustrated with a straw 300, some embodiments may also include just a body 100 and elbow 200 configured to accept a straw 300. For example, an aerosol actuator 50 may include a body 100 assembled with an elbow 200 which can be shipped to a desired location for assembly to an aerosol product 950. The aerosol actuator 50 may be shipped without an included straw 300 to avoid disengagement of the straw 300 during shipping or filling processed. A straw 300 may then be assembled into the body 100 and elbow 200 after the aerosol actuator 50 is attached to an aerosol product 950. In still other embodiments of the invention, a straw 300 may be assembled to the aerosol actuator 50 by an end user having bought an aerosol actuator 50 assembled to an aerosol product 950. In other embodiments, multiple sized straws 300 may be provided with an aerosol actuator 50 for assembly into the aerosol actuator 50 by a user such that the user can select the size or shape desired for a particular application.

Having thus described certain particular embodiments of the invention, it is understood that the invention defined by the appended claims is not to be limited by particular details set forth in the above description, as many apparent variations thereof are contemplated. Rather, the invention is limited only be the appended claims, which include within their scope all equivalent devices or methods which operate according to the principles of the invention as described.

What is claimed is:

1. An aerosol actuator, comprising:
   a body, comprising:
      a manifold; and
      a button in communication with the manifold;
   an elbow attached to the body, comprising:
      a straw guide; and
      a mandrel surface;
   a straw connected to the manifold, wherein the straw passes through the straw guide and over at least a portion of the mandrel surface.

2. The aerosol actuator of claim 1 wherein the body comprises a unitary body.

3. The aerosol actuator of claim 1, wherein the button further comprises a tab in the body defined by a button gap.

4. The aerosol actuator of claim 1, wherein the button further comprises at least one tactile feature on the button.

5. The aerosol actuator of claim 1, further comprising:
   a pin hole in the body; and
   a pin on the elbow, wherein the pin sits in the pin hole.

6. The aerosol actuator of claim 1, further comprising:
   at least one locking bump on the body;
   at least one locking indentation on the elbow; and
   wherein rotation of the elbow allows the at least one locking bump to seat in the at least one locking indentation.

7. The aerosol actuator of claim 1, wherein the elbow further comprises a locking tab.

8. The aerosol actuator of claim 7, wherein the locking tab seats against the manifold in a closed position.

9. The aerosol actuator of claim 7, wherein the locking tab seats against the button in a closed position.

10. The aerosol actuator of claim 1, further comprising:
    a closed position wherein the straw is bent around the mandrel surface; and
    an open position wherein the straw is substantially straight.

11. An aerosol dispensing system, comprising:
    an aerosol package, comprising:
       a container;
       an valve cup attached to the container; and
       a valve seated in the valve cup;
    an aerosol actuator attached to the aerosol package, comprising:
       a body, comprising a manifold;
       an elbow, comprising a locking tab, wherein the locking tab is seated against a portion of the manifold in a closed position and is separated from the manifold in an open position; and
       a straw.

12. The aerosol dispensing system of claim 11, wherein the body further comprises:
    a wall;
    a button defined by a button gap in the wall; and
    a manifold integrated with the button.

13. The aerosol dispensing system of claim 11, wherein the elbow further comprises:
    a straw guide;
    a mandrel surface; and
    wherein a portion of the straw is seated in the straw guide.

14. The aerosol dispensing system of claim 11, further comprising a product in the container.

* * * * *